United States Patent

[11] 3,611,315

[72] Inventors Masuo Murano Kokubunji-shi; Hisashi Horikoshi, Tachikawa-shi, both of Japan

[21] Appl. No. 864,649

[22] Filed Oct. 8, 1969

[45] Patented Oct. 5, 1971

[73] Assignee Hitachi, Ltd. Tokyo, Japan

[32] Priority Oct. 9, 1968

[33] Japan

[31] 43/73129

[54] MEMORY CONTROL SYSTEM FOR CONTROLLING A BUFFER MEMORY

8 Claims, 1 Drawing Fig.

[52] U.S. Cl. .......... 340/172.5

[51] Int. Cl. .......... G06f 13/00

[50] Field of Search .......... 235/157; 340/172.5

[56] References Cited

UNITED STATES PATENTS

| | | | |
|---|---|---|---|
| 3,218,611 | 11/1965 | Kilburn et al. | 340/172.5 |
| 3,354,430 | 11/1967 | Zeitler, Jr. et al | 340/172.5 |
| 3,422,401 | 1/1969 | Lucking | 340/172.5 |

OTHER REFERENCES

Annunziata, E. J. and Winter, L. F.; Buffer Control Storage, In IBM Technical Disclsoure Bulletin; Vol. 11, No. 7, Dec., 1968; pp. 831–832.

Conti, C. J.; Concepts For Buffer Storage, In Computer Group News, March, 1969; pp. 9–13.

*Primary Examiner*—Gareth D. Shaw

*Assistant Examiner*—Melvin B. Chapnick

*Attorney*—Craig, Antonelli, Stewart & Hill

ABSTRACT: A memory control system for a computer having a main memory, a central processor, a buffer memory and a memory controller. The buffer memory comprises a plurality of sectors each consisting of a plurality of blocks, and information for each block is read out from the main memory to be stored in the buffer memory. The memory controller includes associative registers in which the page address in the main memory of the information stored in the buffer memory and the validity indicator indicating the readout block are stored. The central processor applies a read or write request signal as an address signal to the memory controller, and upon receiving the address signal from the central processor, the memory controller checks the presence or absence of a page address which coincides with more significant bits of the address signal and when such a page address is present, the memory controller applies a read or write request signal to the buffer memory immediately. After that the memory controller checks the validity indicator, and when it is proved invalid, the memory controller operates so as not to transfer to the central processor the result of access to the buffer memory.

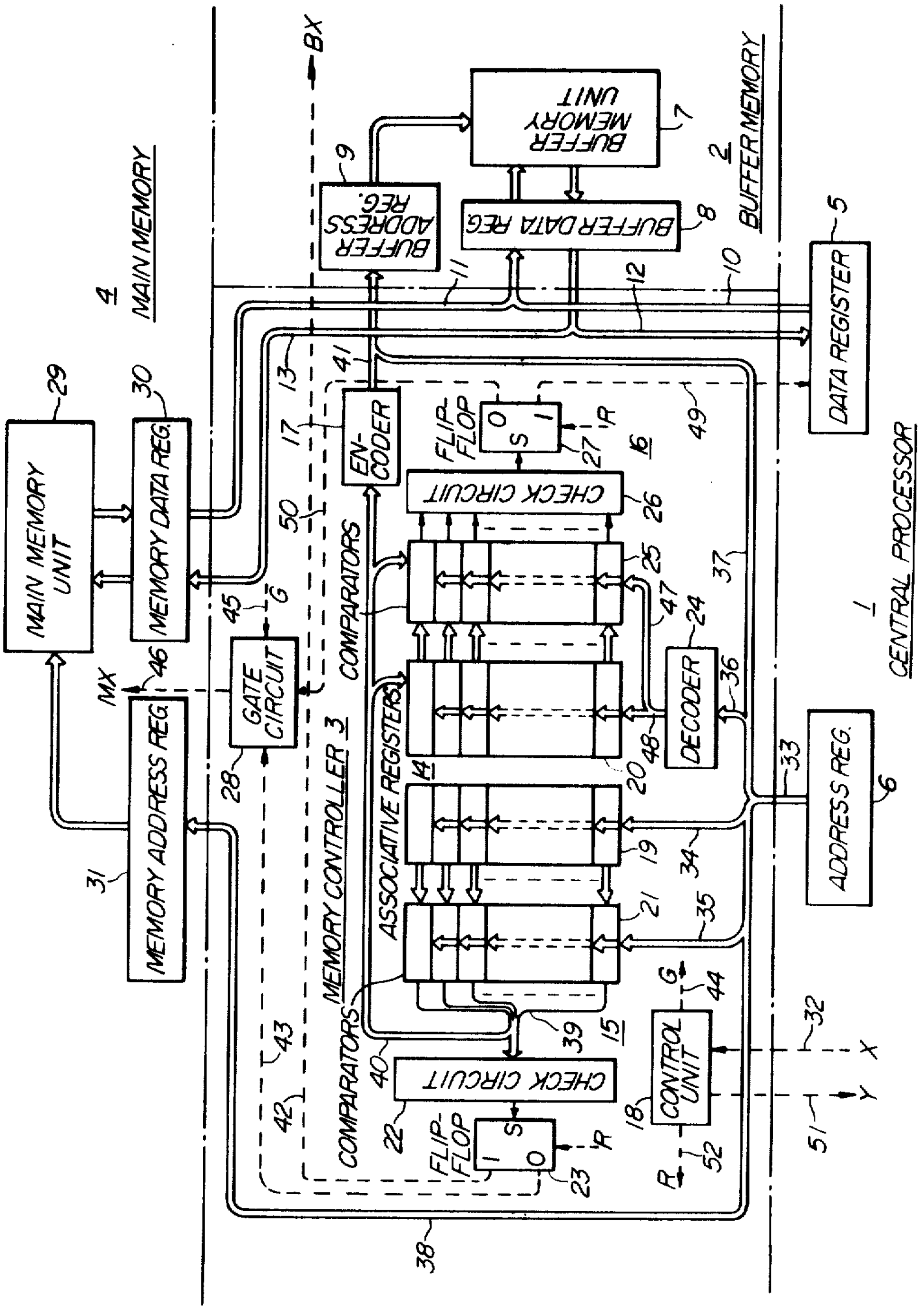
INVENTORS
MASUO MURANO and HISASHI HORIKOSHI
BY Craig, Antonelli, Stewart & Hill
ATTORNEYS

MEMORY CONTROL SYSTEM FOR CONTROLLING A BUFFER MEMORY

BACKGROUND OF THE INVENTION

1. Field of the Invention

This invention relates to a memory control system for an information-processing apparatus and more particularly to a memory control system for a buffer memory.

2. Description of the Prior Art

The rapid development of semiconductor circuit techniques in recent years has led to a remarkable increase in the operation speed of central processors of computers, and a large gap has resulted between the operation speed of central processors and the access time of large-capacity memory units. In an attempt to avoid such a gap, a method of a small capacity capable of giving a high-speed access is prepared to improve the equivalent access time for the whole memory. Such a method is disclosed by D. H. Gibson in "Considerations in Block-Oriented Systems Design," S. J. C. C., 1967 and by C. J. Conti et al. in "Structural Aspects of the System/360 Model 85 ," IBM Systems Journal, Vol. 7, No. 1, 1968.

According to the above method, the electronic computer is composed of a central processor, a main memory, a buffer memory having an operating speed several to several 10 times that of the main memory, and a memory controller which checks whether or not information at an address is read out from the main memory and stored in the buffer memory. The buffer memory is divided into a plurality of sectors and each sector is further divided into a plurality of blocks each consisting of a plurality of words. Upon a read request from the central processor, information corresponding to one block is simultaneously read out from the main memory and stored in the buffer memory. Generally, each sector has a capacity corresponding to one page of the main memory and each block has a capacity of the order of one-sixteenth to one-thirtysecond of the sector. The memory controller includes associative registers provided one for each of the sectors in buffer memory and holding therein the addresses of information stored in the corresponding sectors of the buffer memory, and means for checking whether or not the information at the address sent out from the central processor is held in the buffer memory on the basis of the contents of the associative registers. Further, the associative registers comprise a sector part for holding therein the page address in the main memory of the information stored in each sector and a validity indicator part for indicating blocks of the sector in which the valid information is stored. Accordingly, when an address signal is supplied to the memory controller from the central processor together with a read or writ request, the portion of more significant bits of the address signal pointing out the page address is compared with each page address held in the sector part. When there is a coincidence between the page addresses, the validity indicator of the block in the sector pointed out by the portion of less significant bits of the address signal is checked. When, consequently, the validity indicator is found valid, a read or write request is applied to the buffer memory.

Since, as described above, the check on the sector part and the block validity indicator part is necessarily carried out prior to access to the buffer memory, this method is defective in that the access to the buffer memory is delayed by a period of time required for checking the address signal. In order to, therefore, improve the operation speed of the whole memory and to effectively operate the whole system, the period of time required for checking the address must be reduced to a minimum.

SUMMARY OF THE INVENTION

It is a primary object of the present invention to reduce the period of time required for the checking of an address which checking is performed prior to access to the buffer memory and to increase the effective speed of the memory.

Another object of the present invention is to make possible the access to the buffer memory without waiting for checking of the block validity indicator part as soon as a sector is found to have a coinciding page address as a result of checking of the sector part.

A further object of the present invention is to provide an inexpensive memory control system in which means for checking the block validity indicator part can be formed by a low speed circuit without in any way reducing the operating speed of the whole memory.

According to the present invention, the address check means of the memory control system is composed of sector part check means and block validity indicator part check means generating respective check signals. As soon as a check of the sector part shows a coincidence between the page addresses, a read or write request is sent to the buffer memory without waiting for the result of the check of the block validity indicator part, and the information is read out from or written in the buffer memory. After the sending of the read or write request, the block validity indicator part is checked. The information consequently read out from the buffer memory is controlled by the result of the check of the block validity indicator part to be transferred to the central processor.

BRIEF DESCRIPTION OF THE DRAWING

The sole FIG. is a circuit diagram of part of an embodiment of the present invention.

DESCRIPTION OF THE PREFERRED EMBODIMENT

Referring to the drawing, the computer system comprises a central processor 1, a buffer memory 2, a memory controller 3 and a main memory 4. The central processor 1 is shown as solely having a data register 5 and an address register 6, and other elements are not shown herein as they are unnecessary for the understanding of the present invention. The buffer memory 2 includes a buffer memory unit 7, a buffer data register 8 and a buffer address register 9. Data signals are applied from the central processor 1 and the main memory 4 to the buffer data register 8 by way of signal lines 10 and 11, and the buffer data register 8 sends out a data signal to the central processor 1 and the main memory 4 by way of signal lines 12 and 13.

The memory controller 3 includes associative registers 14, sector check means 15, block check means 16, an encoder 17, a control unit 18, a decoder 24 and a gate circuit 28. The associative registers 14 comprise sector part registers 19 corresponding to the respective sectors in the buffer memory unit 7 and block validity indicator part registers 20. The sector check means 15 comprises comparators 21 for comparing the addresses held in the sector part registers 19 with more significant bits corresponding to the page address of an address signal sent out from the address register 6 through signal line 35, a check circuit 22 for checking whether or not an output signal among the output signals from the comparators 21 corresponding to the respective sectors shows a coincidence in the page address, and a flip-flop 23 actuated by such an output signal from the check circuit 22. The block check means 16 comprises block comparators 25 for comparing a signal obtained by decoding the block portion of the address signal by the decoder 24 with signals pointing out the validity of the blocks in the sectors held in the block validity indicator part registers 20 and further comparing the result of comparison for every sector with the output signals from the comparators 21 in the sector check means 15, a check circuit 26 for checking whether or not an output signal among the output signals from the block comparators 25 corresponding to the respective sectors shows a coincidence in the block, and a flip-flop 27 actuated by such an output signal from the check circuit 26.

The main memory 4 includes a main memory unit 29, a memory data register 30 and a memory address register 31.

The elements 7, 17, 18, 22, 24, 26, 28, and 29, shown in block diagram form in the figure are known elements, readily understood to one of ordinary skill in the art. For example, the buffer memory unit 7 and main memory unit 29 are disclosed in section 12 of "Computer Handbook" edited by Husky and Korn, 1962. In "Digital Computer Design" by Edward J. Braun, 1963, there are disclosed the gate circuit 28, on pages 102 to page 116, control unit 18 on pages 385 to 389, encoder 17 and decoder 24 on page 387, and the check circuit 22 and check circuit 26 on pages 521 to 530.

The operation of the embodiment of the present invention will now be described. For the purpose of practical description, it is supposed herein that one block includes 32 bytes and one sector includes 32 blocks. Accordingly, five bits ranging from $2^5$ to $2^9$ of an address signal correspond to the block and those bits over $2^{10}$ correspond to the sector.

When a request signal X is applied from the central processor 1 to the control unit 18 by way of a control signal line 32, the control unit 18 supplies timing signals successively to various parts of the memory controller 3 to start up a cycle for the checking of an address signal applied from the address register 6 by way of signal line 33.

At first, the bits over $2^{10}$ corresponding to the sector of the address signal are applied to unit circuits of the comparators 21 corresponding to the respective sectors, and after being compared with the page addresses held in the sector part registers 19, 16 signals are delivered from the comparators 21 for each sector. The 16 signals are applied by way of a signal line 39 to check circuit 22 which may be an OR circuit, and when one signal among the 16 signals shows a coincidence in the address, such a signal sets the flip-flop 23. At the same time, the 16 signals are applied by way of a signal line 40 to the block part registers 20 and comparators 25. These signals are also applied to the encoder 17 to be converted into a four-bit signal corresponding to the most significant four bits of the address of the sector in the buffer memory. This four-bit signal is supplied to the most significant four bits of the buffer address register 9 by way of a signal line 41.

When the flip-flop 23 is set due to the fact that each page address in the sector part coincides with the page address of the address signal, a request signal BX is applied from the flip-flop 23 to the buffer memory 2 by way of a control signal line 42. Less significant bits below $10^9$ of the address signal are applied by way of a signal line 37 from the address register 6 to the less significant bits below $10^9$ of the buffer address register 9 and are combined with the most significant four bits applied through the signal line 41 to determine the address in the buffer memory unit 7. Although not shown in the drawing, since whether the request signal BX requests readout or write-in is identified by a signal from the control unit 18, readout from or write-in to the buffer memory unit 7 is carried out on the basis of the above address.

When the flip-flop 23 is not set due to the fact that each page address in the sector part does not coincide with the page address of the address signal, an inverted signal of the request signal BX appears on a control signal line 43 and is controlled in the gate circuit 28 by a gate signal G applied from the control unit 18 by way of control signal lines 44 and 45, and as a result, a request signal MX is delivered from the gate circuit 28 to be applied to the main memory 4 by way of a control signal line 46. This request signal MX indicates a read request, and in the case of a write request, no checking is made and the request is immediately directed to the main memory 4.

On the other hand, the address signal is applied by way of a signal line 36 to the decoder 24 in which the five-bit signal of $2^5$ to $2^9$ corresponding to the block is converted into a signal pointing out one of the 32 blocks. This signal is applied to the block comparators 25 by way of a signal line 47. In each comparator 25, the signal is compared with 32 signals supplied from the block validity indicator part 20 and an output signal is delivered which represents the contents of the validity indicator of the decoded block. This output signal is further subject to gating by the output signals applied from the comparators 21 through the signal line 40. When a coincidence occurs in both the sector part and the block part, the signal is checked by the check circuit 26 to set the flip-flop 27.

The flip-flop 27, when so set, applies a set output signal to the data register 5 by way of a control signal line 49. When the request signal X from the central processor 1 is a read request, a data signal stored in the buffer data register 8 is transferred through the signal line 12 to be set in the data register 5. When the request signal is a write request, information may be written in the buffer memory 2 after merely checking the sector part 19 regardless of the result of the check of the block part 20. In this case, no error will result since the validity of writing is indicated by the block validity indicator. The flip-flops 27 and 23 are reset by a reset signal R delivered from the control unit 18 by way of a control signal line 52 prior to checking on the next address signal.

When the flip-flop 27 is not set, its reset output signal is applied to the gate circuit 28 by way of a control signal line 50. This signal is controlled by the gate signal G indicating the fact that the read request is issued so that a request signal MX is applied to the main memory 4.

Thus, a request signal may be applied to the buffer memory 2 without waiting for the result of a check of the block part 20 when a sector showing a coincidence has been detected after a check of the sector part 19. Since the result of checking on the block part 20 is known prior to the completion of processing in the buffer memory 2, the above result may be relied upon to determine whether the result of processing in the buffer memory 2 is to be utilized or not.

Accordingly, the block check means 16 can be of a slow operating speed substantially similar to the access time for the buffer memory 2 and can be constructed from inexpensive low speed circuits. In contrast, prior art systems are not provided with the flip-flop 23, and the request signal is not applied to the buffer memory until the check of both the sector part and the block part is completed and the flip-flop 27 is set after finding the presence of information at a requested address in the buffer memory. Therefore, the request signal to the buffer memory is delayed by the period of time required for check of the block part compared with the present invention. Thus, the block check means in the prior art systems must be composed of high-speed circuits to reduce the period of time required for checking which becomes quite expensive.

After the request signal MX is applied to the main memory 4, a data signal is read out from the main memory unit 29 by the address signal which is applied through a signal line 38 to the memory address register 31 and set therein. The data signal is fed from the memory data register 30 to the buffer data register 8 by way of the signal line 11 and then to the data register 5 by way of the signal line 10 under control of the control unit 18. Thereafter, a reply signal Y is delivered from the control unit 18 to be applied to the central processor 1 by way of a control signal line 51. In the meantime, information for one block consisting of 32 bytes or four double words including the one double word information at the address is successively supplied from the memory data register 30 to the buffer data register 8 and is stored in a predetermined block of the buffer memory unit 7 under control of the control unit 18. At the same time, the bits above $2^{10}$ of the address signal supplied by way of a signal line 34 are set in a vacant and available register of the sector part registers 19, and the signal obtained by decoding the five bits of $2^5$ to $2^9$ of the address signal by the decoder 24 is supplied to the block validity indicator part 20 by way of a signal line 48 to be set therein. When a signal which is the same as the page address signal of the address signal has already been set in the sector part 19, only the block signal decoded by decoder 24 is set in the block validity indicator part 20. Where there is no vacant and available associative register 14, a sector storing therein old information or information which is not so frequently used is selected. All the block validity indicator part registers 20 corresponding to the selected sector are reset and a new address is set in the register corresponding to the selected sector in the sector part registers 19.

It will be understood from the foregoing description that, according to the present invention, the period of time required for checking of an address signal prior to the access to the buffer memory can be remarkably reduced, thereby reducing the cycle time of the buffer memory and making it possible to employ inexpensive check circuits. Although the main memory, the buffer memory, the memory controller and the central processor include many circuits not shown in the drawing, these circuits are omitted since they are unnecessary for an explanation of the present invention.

While an embodiment of the present invention has been described in the above by way of example, the associative registers 14 may include sector validity indicator registers for determining the validity or invalidity of the whole sectors so that their outputs may be used to gate the output signals from the comparators 21. Such an arrangement of associative registers, sector check means and block check means is also included in the scope of the present invention.

We claim:

1. A memory control system for a computer having a central processor, a main memory, a buffer memory including a plurality of sectors each consisting of a plurality of blocks, and a memory controller controlling the buffer memory, said memory controller comprising:

a plurality of associative registers for operatively holding therein the page addresses in the main memory of information stored in said sectors and also validity indicators pointing out in what block in said sectors valid information is stored;

means for comparing more significant bits corresponding to the page address of an address signal supplied from said central processor with the page address held in said associative registers;

sector check means for checking whether an output signal showing a coincidence between more significant bits of the address signal and the page addresses is delivered from said comparing means;

means for immediately applying a request signal to said buffer memory when said output signal is produced;

block check means for checking the validity indicators by less significant bits corresponding to the block of said address signal after applying the request signal to said buffer memory; and means for generating a signal so that the result of processing in said buffer memory carried out upon the above request may not be transferred to said central processor.

2. A memory control system as claimed in claim 1, in which said associative registers comprise a sector part for storing therein the page address in the main memory of the information stored in said sectors and the validity indicators pointing out the validity of information stored in the blocks in said sectors.

3. A memory control system as claimed in claim 1, in which said sector check means comprises a check circuit for detecting an output signal from said comparing means showing coincidence between more significant bits of the address signal and the page addresses, and said request signal-applying means comprises a flip-flop adapted to be set by a detecting signal from said check circuit to apply the request signal to said buffer memory.

4. A memory control system as claimed in claim 1, in which said block check means comprises a decoder for converting the bits corresponding to the block of the address signal supplied from said central processor into a signal pointing out the block, comparators for comparing the decoded signal from said decoder with said validity indicators, and delivering output signals showing whether the decoded signal is coincident with the validity indicators, gate circuits for gating the output signals from said comparators with the output signal delivered from said comparing means, and a check circuit for detecting an output signal showing coincidence between the decoded signal and validity indicators among the output signal from said gate circuits, and wherein said signal-generating means comprises a flip-flop for generating a signal for preventing a data signal from being sent from said buffer memory to said central processor.

5. A memory control system for a computer having a central processor, a main memory, a buffer memory including a plurality of sectors each consisting of a plurality of blocks and a memory controller for controlling said buffer memory, said memory controller, comprising:

a plurality of associative registers for holding therein the page addresses, in said memory, of information stored in said sectors and validity indicators identifying which block in said sectors has valid information stored therein;

means, responsive to said registers and said central processor, for comparing the bits corresponding to the page address of an address signal supplied from said central processor with the page addresses held in said associative registers;

sector check means responsive to the output of said comparing means, for generating an output signal when coincidence between first significant bits of the address signal and the page addresses is provided by said comparing means;

means, responsive to said output signal produced by said sector check means, for supplying a request signal to said buffer memory;

block check means, responsive to the bits less significant than said first significant bits representative of the outputs of said associative registers corresponding to the block of the address signal for checking said validity indicators, after said request signal is supplied to said buffer memory; and means for preventing the result of processing in said buffer memory in response to said request signal from being transferred to said central processor.

6. A memory control system according to claim 5, wherein said associative registers comprise a sector portion for storing therein the page address in the main memory of the information stored in said sectors and the validity indicators identifying the validity of information stored in the blocks in said sectors.

7. A memory control system according to claim 6, wherein said sector check means comprises a check circuit for detecting an output signal from said comparing means upon coincidence between said first more significant bits of the address signal and the page addresses, and wherein said request signal-applying means comprises a first flip-flop, adapted to be fed by a detecting signal from said check circuit, for applying the request signal to said buffer memory.

8. A memory control system according to claim 7, wherein said block check means comprises a decoder for converting the bits corresponding to the block of the address signal supplied from said central processor into a signal identifying the block, comparators for comparing the decoded signal from said decoder with said validity indicators and delivering output signals representative of whether the decoded signal is coincident with the validity indicators, gate circuits for gating the output signals from said comparators with the output signal provided by said comparing means and a check circuit for detecting an output signal showing coincidence between the decoded signal and validity indicators among the output signals from said gate circuits, and wherein said signal-generating generating means comprises a second flip-flop for generating a signal for preventing data from being sent from said buffer memory to said central processor.